June 4, 1940. R. L. MILLER 2,203,283
FOIL CONDENSER AND METHOD OF PRODUCING SAME
Filed Oct. 13, 1933
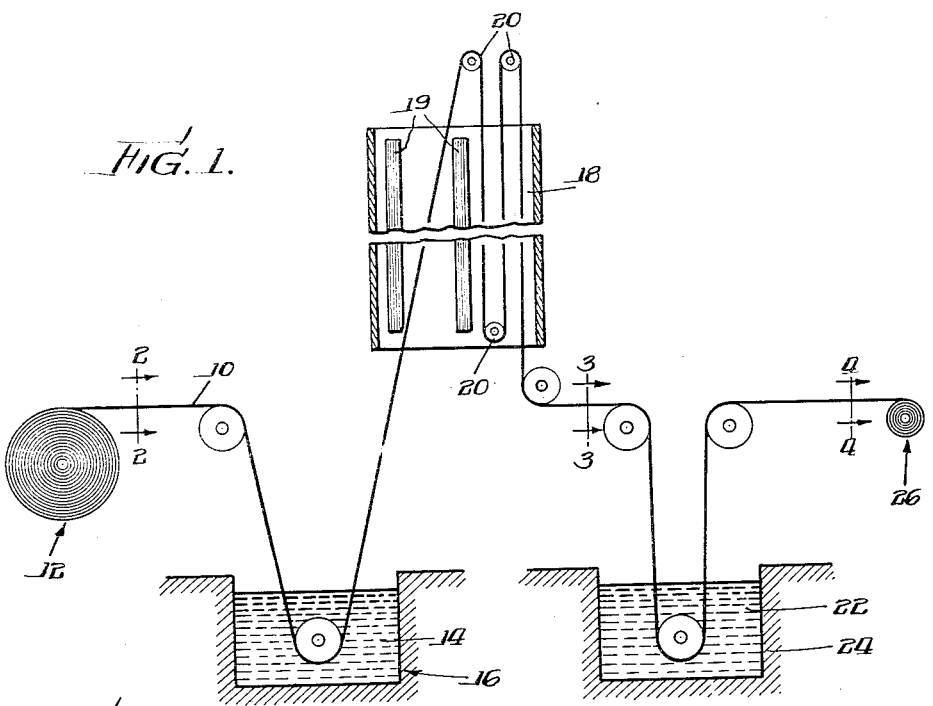
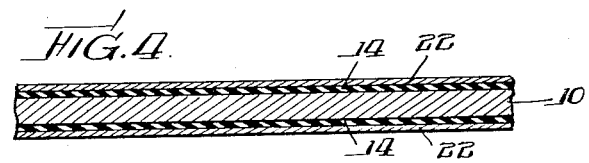
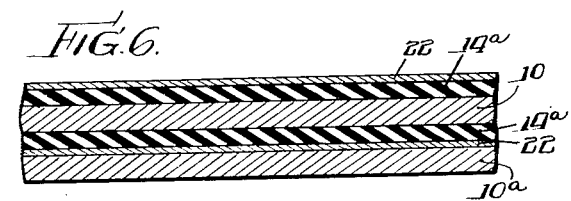
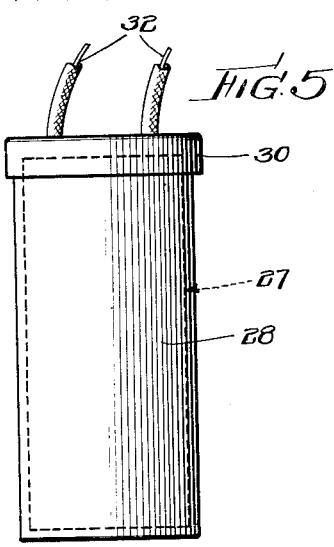
Inventor:
Roger L. Miller
By:- Cox & Moore
attys.

Patented June 4, 1940

2,203,283

UNITED STATES PATENT OFFICE 2,203,283

FOIL CONDENSER AND METHOD OF PRODUCING SAME

Roger L. Miller, Lincoln, Ill.

Application October 13, 1933, Serial No. 693,412

10 Claims. (Cl. 175—41)

My invention relates generally to improvements in electrostatic foil condensers and to improved methods of producing same.

Commercial types of foil condensers, with which I am familiar, possess certain inherent mechanical and electrical deficiencies, and high raw material costs which I propose to obviate by my present invention. One of the most common types of electrostatic foil condensers is that employing sheets of paper as a dielectric in combination with a foil of conductive material. These paper sheets are relatively thick as compared with the dielectric which I provide by my present invention, and in the manufacture of foil type condensers interleaved with paper sheets, considerable difficulty has been experienced in excluding air and moisture. In other words, these conventional condensers frequently present voids or interstices between the dielectric and foil, which serve to decrease the breakdown strength or dielectric strength. It can be stated that my present invention contemplates the provision of a foil condenser, together with methods of making same wherein the following properties are present: High breakdown strength (dielectric strength); high insulation resistance; high dielectric constant; and low energy losses such as result from the presence of an air film or moisture and non-uniformity of physical texture.

It is the primary object of my invention to provide a foil type condenser having the above-mentioned and other advantageous characteristics, and to this end I propose to provide a relatively thin dielectric coating per voltage rating (KVA) having improved structural and electrical properties.

Another object of my invention is to provide a condenser as above set forth, in which said coating is pliable or yieldable but not subject to "cold flow" and thereby enables the foil to be bent without impairing the coating, and also enabling the condenser to be pressed so as to decrease the distance between the conductors, decrease possible air film, and at the same time maintain the desired elecrical characteristics.

A further object of my invention is to produce a foil condenser as above set forth, wherein the coating is free from oxidization, is uniformly applied, and is adapted for long life use at a voltage rating much nearer its flash point without experiencing any impairment of its functional characteristics.

Another object is to provide a coated foil condenser which can be operated at a much higher temperature than the paper foil unit, in fact, more than twice as high.

Still another and more specific object of my invention is to provide a foil type condenser provided with a thin coating of a rubber compound, per voltage rating (KVA), which may be applied by passing the conductive foil, such as aluminum, through a rubber solution.

A further object is to provide a method of manufacture whereby the conductive foil, after it has passed through the coating solution is dried and then passed through an impregnating solution, preferably an oxidized and polymerized oil such as a vegetable oil to which an anti-oxidant may be added.

In addition to the foregoing and numerous other objects and advantages, my invention contemplates a condenser, as well as a method of making same, which is provided with the above mentioned dielectric coating, and which is impregnated with substances, such as oxidized and polymerized oil containing an anti-oxidant.

The foregoing and numerous other objects and advantages will be more apparent from the following detailed description when considered in connection with the accompanying drawing, wherein—

Figure 1 discloses diagrammatically steps in a method of making my improved foil type condenser;

Figure 2 is an enlarged cross-sectional view of the foil taken along the line 2—2 of Figure 1;

Figure 3 is a similar enlarged cross-sectional view of the foil after it has been coated with the rubber compound, said view being taken along the line 3—3 of Figure 1;

Figure 4 is also an enlarged sectional view of the coated foil after the dielectric thereof has had applied thereto a coating of impregnating liquid such as oil;

Figure 5 discloses one type of completed condenser wherein the coated foil is coiled and impregnated within a suitable container; and Figure 6 discloses a foil having a thicker dielectric coating shown in association with a plain or uncoated foil.

Referring now to the drawing more in detail wherein like numerals have been employed to designate similar parts throughout the various figures, it will be apparent that my invention contemplates coating a conductive foil such as an aluminum foil 10, by withdrawing said foil from a suitable source or reel 12, and passing said foil through a bath or solution of dielectric material 14 within a reservoir 16, said solution consisting preferably of rubber or a rubber compound. After the foil has received the uniform, thin coating 14, it is passed into a drying chamber 18. Heated air within the chamber 18 dries the coating 14 as the lengths of coated material pass between sheaves or pulleys 20. Any suitable type of heating elements 19 may be employed to heat the air within the chamber 18. This heating process serves to evaporate the solvent or carrier in the solution.

From the heating chamber 18 the foil 10, which now carries the dielectric coating of rubber 14, passes through a liquid or oil bath 22 within a suitable reservoir 24. I prefer to employ an oxidized and polymerized vegetable oil such as castor oil. This oil coating 22 is very viscous and tenacious. That is to say, the coating 22 forms a uniform, sticky protective covering for the dielectric 14, and thus presents a very effective impregnation of the dielectric eliminating all surface air film. The foil 10 with its coatings 14 and 22 is then directed to a point where it is formed into a roll 26 of desired size.

When the roll 26 has been completed, it is severed from the remaining portion of the coated foil and wound into condenser units 27, and then placed within a suitable container 28 (Figure 5. This container 28 together with its cover member 30 is then placed within a vacuum chamber (not shown) after terminals 32 have been properly connected with the conductive strip 10. Before the container is removed from the vacuum chamber, a supply of impregnating material 22 is introduced so as to completely fill all of the interstices or voids present. The container 28 is then completely sealed and removed from the vacuum chamber.

The above described step of vacuum impregnation is not new except as it is applied to the particular material which I employ in the manufacture of my improved condenser. In conventional methods of impregnation with which I am familiar, it is sometimes necessary to employ a "potting" step, namely, the step of potting the impregnated unit in the container after the vacuum impregnation of the unit has been completed. The step of potting may be described as the step in the treatment of a paper foil condenser which follows the vacuum impregnation of said condenser. Potting consists in placing the condenser unit or units in a can or other housing and filling the same with asphalt or similar material to prevent absorption of moisture by the paper foil. By practicing my improved method, the necessity of potting after vacuum impregnation is completely obviated because I employ a rubber compound which does not absorb moisture. Potting is necessary when an absorbent dielectric such as paper sheeting is employed.

I have employed various solutions for dielectric purposes, among them being a chlorinated rubber, sulphonated rubber, rubber, rubber compounds, synthetic rubber, 85 percent vinyl chloride, 15 percent vinyl acetate, and others. Obviously the dielectric material to be used depends upon the properties which are desired in the finished condenser. Cellulose acetate to which a sufficient plasticiser, such as a sulphur compound, has been added to make the coating pliable, may be used, the relative amounts of the constituent materials depending upon the electrical characteristics desired. I prefer to employ a heated dielectric solution or an unheated dielectric solution of low viscosity, in reservoir 16, and also prefer to employ heated liquid or oil in the reservoir 24. As stated above, I prefer to employ oxidized and polymerized vegetable oils, such as castor oil. In fact, a mixture of oxidized and polymerized vegetable oil such as castor oil and chlorinated naphthalene and also chlorinated diphenyl may be used. The mixture of 25% chlorinated naphthalene and 75% oxidized and polymerized castor oil to which an anti-oxidant has been added, is particularly adaptable for certain types of condensers. In other words, the invention contemplates various materials to be used for dielectric and impregnation purposes.

As is commonly known, rubber, rubber derivatives, rubber compounds and vinyl compounds are attacked by ordinary oils. However, these substances are not affected, even at high temperatures, by oxidized and polymerized vegetable oils such as we have described above.

By employing the above described method, I am able to produce practically any desired uniform thickness of plastic coating of dielectric material upon the foil. In fact, I am able to produce a dielectric film or coating of uniform texture having a thickness as thin as .25 mil., or as thick as 50 mils. When this thickness of coating is compared with foil condensers of conventional form interleaved with paper sheets, it will be apparent that my dielectric coating is relatively thin for its voltage rating (KVA). Not only can my improved dielectric coating be produced in a relatively thin coating, but it can also be produced free from interstices or voids and free from moisture and surface air film. When it is understood that the presence of as much as .5 per cent moisture is sufficient to reduce the breakdown strength and insulation resistance of the condenser to the point where the device is worthless for condenser purposes, the importance of preventing the occlusion of moisture will be readily appreciated. After my improved rubber compound coating has been completely dried, it is very resistant to moisture absorption, and to preclude any possibility of surface moisture, and to eliminate any surface air film, I employ the impregnating material or coating 22.

The importance of having relatively thin dielectric coatings per voltage rating (KVA) will be more readily apparent when it is recalled that the capacity of a condenser is equal to $$\frac{KA}{4\pi d}$$

where $K$=dielectric constant, $A$=area of conducting surface, and $d$=thickness of dielectric. In the manufacture of paper foil condensers to meet a minimum breakdown strength of 850 v. D. C., two layers of .4 mil. condenser paper interleaving are employed between the conductive foils. By employing my improved rubber compound coating, it is possible to obtain the same breakdown strength when using two coated foils, each having a coating per side averaging about .25 mil. thickness, or one foil with .5 coating on each side, combined with a plain or uncoated foil as shown in Fig. 6. Assuming the wax film, or oil film as the case may be, to be the same in both types of units, it will be apparent that by using my improved dielectric coating the thickness of the dielectric is reduced about 40%. Stating it another way, by employing my improved dielectric coating, the surface area of the condenser can be reduced about 40% over that of the paper foil unit and still maintain the same capacity, based on the dielectric constant of the two materials and having only one air film between foils in the coated foil unit as against three air films for the paper foil unit employing two layers of paper interleaving. Under present commercial practice, the paper foil condenser in some cases is pressed at a pressure as high as 300 lbs. per square inch. By employing any greater pressure, it has been found that the number of units which break down increase in greater proportion than the economic savings. Due to the elasticity of my improved rubber film, the unit may be pressed to a greater extent, and thus obtain an economic saving in size without any impairment of the desired electrical characteristics of the unit. In view of the fact that the capacity of a condenser increases proportionally as the distance between the conductive foil is decreased, it is of the utmost importance to reduce the distance and air film to a minimum if, by so doing, no other factors of functional impairment are introduced. Thus, a condenser unit coated in accordance with the present invention may have the conductive foils spaced from each other a considerably lesser distance, and at the same time maintain the desired dielectric strength.

I have found that my improved rubber coating will sustain voltages over an extended period of time without breaking down. In fact, I have actually found that my coating will withstand a voltage just below its ultimate breakdown strength for a relatively long period. With most other insulators, the voltage value which they will withstand for any period of time is far below the maximum value obtainable for a very short interval, the main reason for this poor performance is due to their containing some residual moisture. My improved rubber compound is exceptionally uniform in texture, and hence has fewer paths of leakage than other insulators with which I am familiar.

Another advantage which my pliable or yieldable dielectric coating offers is that of resisting fracture or rupture when in use. Distortion by electrical stress results from the fact that each time the condenser is charged up, the dielectric is strained mechanically by the force of attraction set up between the charges of opposite polarity on the metal plates in contact with it. In other words, when an alternating voltage is applied and released and reapplied, small physical expansions and contractions of the dielectric must take place, and resistance to these movements must entail the expenditure of energy which is drawn obviously from the electrical circuit supplying the potential. Under such circumstances the yieldable or resilient characteristics of my improved coating eliminate any possibility of fracture, and hence avoid voltage breakdown.

The presence of an air film in a foil condenser must be avoided as far as possible, and this is accomplished by practicing the method described herein. The seriousness of an air film necessitates the complete evacuation of a condenser unit before it is finally impregnated with wax or oil, as the presence of any air bubbles or pockets between the solid dielectric and the metal conductor will result in local heating and may ultimately produce breakdown of the main dielectric at this point. My rubber compound film appears to more nearly satisfy the condition of air exclusion than any other high quality condenser dielectric now employed commercially, to my knowledge. It will be apparent that foil condensers employing paper interleaving greatly increases the possibility of air films inasmuch as it presents the possibility of at least three air films for each paper foil unit as against only one for the coated foil unit.

In Figure 6 I have disclosed a modified coated foil wherein a dielectric coating 14a is substantially twice the thickness of the dielectric coating 14 previously described. By providing a thicker dielectric. I am then able to combine with a coated foil an uncoated foil 18a. These two strips are wound together to provide a condenser, such as a unit 27 indicated in Figure 5. In other words, by simply increasing the thickness of the dielectric coating, I avoid the necessity of employing two coated foils to form a condenser unit. In this manner I also reduce the possibility of air films to a minimum.

I also wish to call attention to the fact that by using the oxidized and polymerized oil with the rubber compound dielectric, the temperature at which the rubber compound will soften, is raised considerably. In other words, a rubber coating without the oil impregnation will soften at a considerably lower temperature that when the oil is present. This enables a condenser unit constructed in accordance with the teachings of my invention to operate at considerably higher temperatures than commercial foil condensers with which I am familiar. In order to preclude any oxidizing effect of the oil, I combine one part of hydroquinone, an anti-oxidant with one-thousandth part of oil. This reduces to a minimum the tendency of the rubber compound to oxidize.

Summarizing the commercial advantages of my improved condenser unit, I have found that I am able to reduce the cost of raw material at least twenty percent. Further, my method materially lowers the cost of manufacture. Also, the unit has improved efficiency and lower power losses. The foil coated with the rubber compound enables condenser units to be produced for greater uniformity in breakdown strength, and thus enables the condenser to operate nearer the flash point. I am also able, as a result of my invention, to produce condenser units which are at least 20 percent smaller in volume or size per microfarad.

It should be noted also that coating materials of the type mentioned above, such as a coating comprised of a rubber derivative may be employed. I make specific reference herein to thermoprene. I also make reference to a dielectric coating comprising partially polymerized chlorinated di-vinyl-acetylene compounded in such a manner as to give good anchorage to the conductive foil, the chlorinated di-vinyl-acetylene being later completely polymerized by heating at an elevated temperature for several hours. The latter substance is a synthetic rubber product to which I have previously made general reference in the description.

Numerous other advantages are presented by my invention, and it should be understood that, while I have set forth certain prescribed steps in the method of procedure, and have specifically referred to materials which may be employed, the invention contemplates various changes and modifications without departing from the spirit and scope of the appended claims.

Having thus described my invention, what I claim as new and desire to secure by Letters Patent is:

1. A foil condenser in which the dielectric comprises a coating of synthetic rubber and oxidized and polymerized vegetable oil.

2. A foil condenser in which the dielectric comprises a rubber substance, and oxidized and polymerized vegetable oil.

3. A foil condenser in which the dielectric comprises rubber, and a coating of oxidized and polymerized vegetable oil to which an anti-oxidant has been added.

4. A foil condenser in which the dielectric comprises a rubber substance and an impregnating material comprising mainly an oxidized and polymerized vegetable oil.

5. A foil condenser in which the dielectric comprises a rubber substance, and a sealing material comprising mainly oxidized and polymerized castor oil impregnating the rubber.

6. A foil condenser in which the dielectric comprises a coating of vinyl chloride and vinyl acetate and oxydized and polymerized vegetable oil.

7. A dielectric coating for a conductive material consisting mainly of chlorinated naphthalene and oxidized and polymerized castor oil.

8. A foil condenser in which the dielectric comprises a coating of sulphonated rubber.

9. A foil condenser in which the dielectric comprises a coating of sulphonated rubber and an impregnating material comprising oxidized and polymerized vegetable oil.

10. An electric condenser comprising a foil of conductive material and a dielectric coating consisting mainly of chlorinated naphthalene and oxidized and polymerized castor oil.

ROGER L. MILLER.